US011392998B1

(12) United States Patent
Kwak et al.

(10) Patent No.: US 11,392,998 B1
(45) Date of Patent: Jul. 19, 2022

(54) SYSTEM AND METHOD FOR COLLECTING AND MANAGING PROPERTY INFORMATION

(71) Applicant: UIPCO, LLC, San Antonio, TX (US)

(72) Inventors: Victor Kwak, Frisco, TX (US); Andrew L. Anaruk, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 599 days.

(21) Appl. No.: 16/288,310

(22) Filed: Feb. 28, 2019

Related U.S. Application Data

(60) Provisional application No. 62/721,366, filed on Aug. 22, 2018.

(51) Int. Cl.
*G06Q 30/02* (2012.01)
*G06Q 50/16* (2012.01)
*G06V 20/20* (2022.01)

(52) U.S. Cl.
CPC ......... *G06Q 30/0278* (2013.01); *G06Q 50/16* (2013.01); *G06V 20/20* (2022.01)

(58) Field of Classification Search
CPC .... G06Q 30/0278; G06Q 50/16; G06Q 40/08; G06Q 50/163; G06Q 50/165;
(Continued)

(56) References Cited

U.S. PATENT DOCUMENTS 9,536,148 B2 * 1/2017 Gross ................. G06Q 30/0643
10,346,924 B1 * 7/2019 Engelhorn ............. G06Q 40/08
(Continued)

FOREIGN PATENT DOCUMENTS

WO  WO-2015035347 A1 * 3/2015 ........... G06Q 10/087

OTHER PUBLICATIONS

You et al. "Image-based appraisal of real estate properties." IEEE transactions on multimedia 19.12 (2017): 2751-2759. (Year: 2017).*
(Continued)

*Primary Examiner* — Sarah M Monfeldt
*Assistant Examiner* — John S. Wasaff
(74) *Attorney, Agent, or Firm* — Plumsea Law Group, LLC

(57) ABSTRACT

A system and method for collecting and managing property information is disclosed. The system and method allow for buyers, sellers, agents and other parties that may have relevant information for a real estate transaction to collect and/or view property information stored in a property information storage system. The system and method include a virtual property notebook that facilitates collecting data about properties so that the information can be added to the property information storage system. Users are guided through a property using the virtual property notebook running as a software application on a remote device. The remote device can be used to collect image information. Users may be instructed to further inspect a property structure such as an appliance that the system has automatically detected. The system and method further include a prediction system that can provide estimated property values based on collected information.

20 Claims, 11 Drawing Sheets

(58) Field of Classification Search
CPC .. G06Q 50/167; G06K 9/00671; G06V 20/20; G06V 20/176
USPC .......................................................... 705/313
See application file for complete search history.

(56) References Cited

U.S. PATENT DOCUMENTS

| | | | | |
|---|---|---|---|---|
| 10,572,947 | B1* | 2/2020 | Berends | G06Q 50/163 |
| 11,037,255 | B1* | 6/2021 | Ganev | G06T 7/0004 |
| 2003/0210228 | A1* | 11/2003 | Ebersole | G06F 3/147 |
| | | | | 345/157 |
| 2009/0006185 | A1* | 1/2009 | Stinson | G06Q 30/0278 |
| | | | | 705/306 |
| 2009/0265193 | A1* | 10/2009 | Collins | G06Q 30/0185 |
| | | | | 901/46 |
| 2010/0299179 | A1* | 11/2010 | Alonso | G06Q 10/10 |
| | | | | 705/7.36 |
| 2011/0270773 | A1* | 11/2011 | Siekman | G06Q 10/20 |
| | | | | 705/305 |
| 2013/0169681 | A1* | 7/2013 | Rasane | G06Q 50/10 |
| | | | | 345/633 |
| 2013/0281207 | A1* | 10/2013 | Lyons | G07F 17/3206 |
| | | | | 463/33 |
| 2014/0310188 | A1* | 10/2014 | Preuss | G06Q 50/163 |
| | | | | 705/314 |
| 2015/0310558 | A1* | 10/2015 | Cuttell | G06Q 40/08 |
| | | | | 705/4 |
| 2016/0055602 | A1* | 2/2016 | Howe | H04N 7/183 |
| | | | | 705/314 |
| 2016/0196625 | A1* | 7/2016 | Adamson | G06Q 50/16 |
| | | | | 705/313 |
| 2017/0076408 | A1* | 3/2017 | D'Souza | G06Q 40/00 |
| 2017/0199647 | A1* | 7/2017 | Richman | G01C 21/20 |
| 2017/0270650 | A1* | 9/2017 | Howe | G06T 7/10 |
| 2018/0158156 | A1* | 6/2018 | Dintenfass | G06K 9/00671 |
| 2018/0173681 | A1* | 6/2018 | Dedhia | G06K 9/00456 |
| 2018/0239313 | A1* | 8/2018 | Santarone | G06F 30/13 |
| 2018/0348143 | A1* | 12/2018 | Ahlstrom | G06F 3/04817 |
| 2019/0005859 | A1* | 1/2019 | Namyslo | G09F 9/372 |
| 2019/0019261 | A1* | 1/2019 | Lammert, Jr. | G06F 16/58 |
| 2019/0098005 | A1* | 3/2019 | Joshi | G06F 3/0346 |

OTHER PUBLICATIONS

Ghimire et al. "Fault diagnosis and augmented reality-based troubleshooting of HVAC systems." 2016 IEEE Autotestcon. IEEE, 2016. (Year: 2016).*

* cited by examiner

SYSTEM AND METHOD FOR COLLECTING AND MANAGING PROPERTY INFORMATION

CROSS-REFERENCE TO RELATED APPLICATIONS

This application claims the benefit of Provisional Patent Application No. 62/721,366, filed Aug. 22, 2018, and titled "System and Method for Collecting and Managing Property Information," which is incorporated by reference herein in its entirety.

TECHNICAL FIELD

The present disclosure generally relates to a system and method for collecting and managing property information, and specifically to a system and method that use augmented reality and artificial intelligence to facilitate data collection.

BACKGROUND

When shopping for a new home, or selling a home, buyers and sellers often rely on information provided by a proprietary third party service, such as the Multiple Listing Service (MLS). The MLS is a platform, including both a database of real estate property listings and software for accessing the listings. However, MLS systems often restrict access to real estate brokers and agents, making it difficult for buyers and sellers to obtain listing information directly. Moreover, because the MLS systems are geared towards real estate brokers and agents, they often contain information that is more appropriate to marketing a property vs. information that is useful for learning about the property and/or estimating its value. This situation limits the free exchange of information, which can result in market inefficiencies as buyers and sellers must go through intermediates (brokers and agents) to learn new information that could affect prices.

There is a need in the art for a system and method that addresses the shortcomings discussed above.

SUMMARY

In one aspect, a method of guiding a user in assessing a property includes the steps of receiving image information from a remote device, the image information corresponding to at least one image of the property and analyzing the image information and detecting a property structure. The method also includes steps of sending instructions to the remote device, the instructions including a request for the user to inspect the property structure and receiving inspection information from the remote device, the inspection information corresponding to the detected property structure. The method also includes the steps of using the image information and the inspection information to determine an estimated property value for the property and sending the estimated property value to the remote device to be displayed for the user.

In another aspect, a method of guiding a user in assessing a property using a remote device includes the steps of capturing images of the property, sending image information to a server, the image information including at least one image of the property and receiving instructions from the server, the instructions including a request for the user to inspect a property structure. The method also includes steps of prompting the user to inspect the property structure, capturing inspection information corresponding to the property structure, sending the inspection information to the server, receiving an estimated property value from the server; and displaying the estimated property value for the user.

In another aspect, a method of creating a property entry in a catalogue of properties includes the steps of receiving property identification information for a property, guiding a user from a first location in the property to a second location in the property, capturing images of the physical property at the second location, analyzing the captured images and detecting a first property structure at the second location, guiding a user from the second location in the property to a third location in the property and capturing images of the property at the third location. The method also includes steps of analyzing the captured images and detecting a second property structure at the third location and generating new information for the property entry based on the first property structure and the second property structure.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
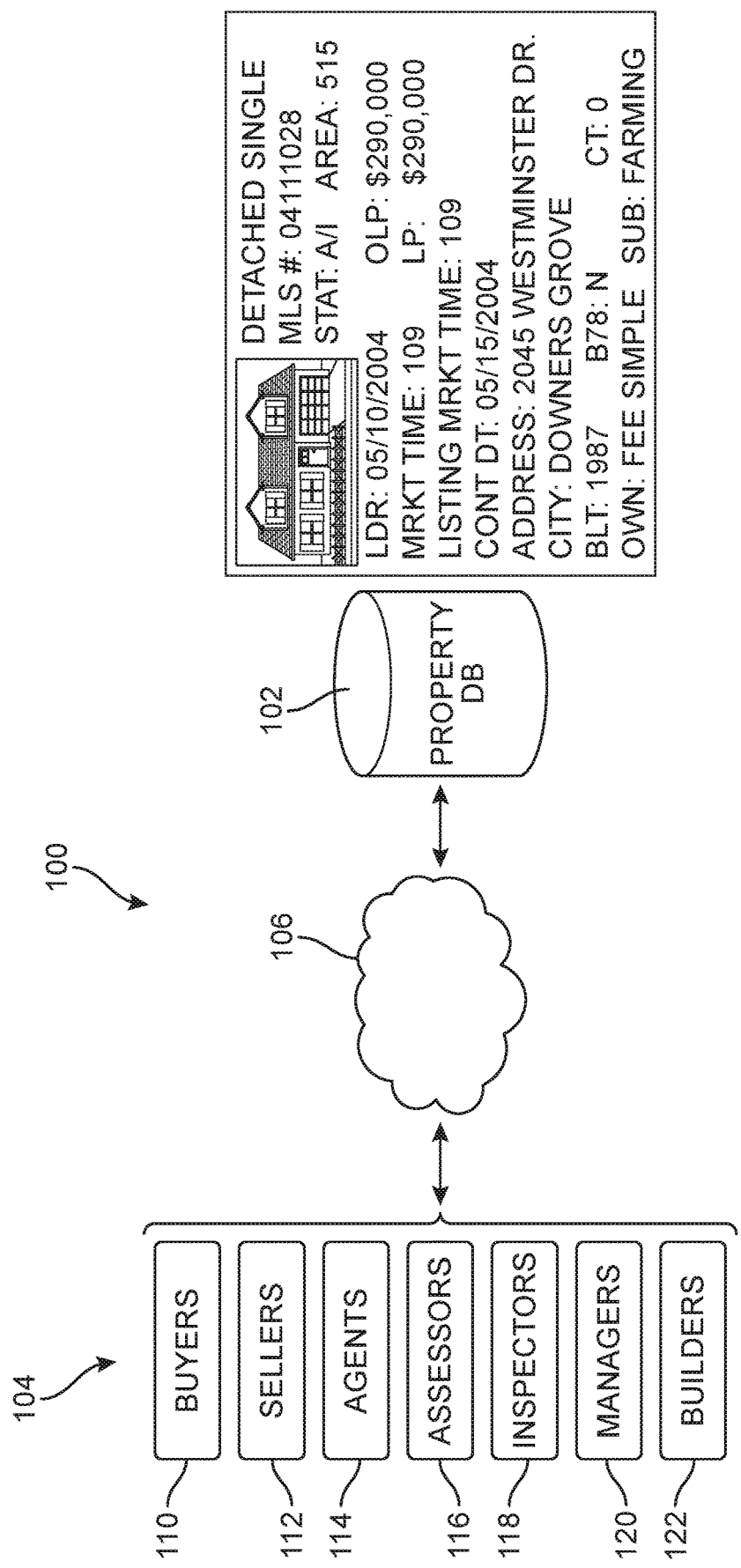
FIG. 1 is a schematic view of a property information system, according to an embodiment.

The embodiments provide a system and method for collecting and managing property information relevant for real estate transactions. The system and method provide a software application running on a remote device that helps guide a user through a property to collect relevant information that can be used to estimate the property's value. By automatically capturing and analyzing image information about property structures (such as appliances or built-in features like cabinets), the system and method improve the efficiency of the assessment process. The system and method also provide tools for building a shared, and possibly open, database that can be accessed by multiple parties including buyers, sellers, real estate agents, inspectors, assessors and others, thereby making property information more readily available to all participants and improving the efficiency of real estate markets.

It is common for property buyers to take pictures or take notes on properties they have viewed. The system and method leverage this existing tendency by providing a virtual property notebook that can be used to collect, store and display property information. Moreover, by providing a virtual property notebook that can generate reports summarizing multiple property listings, the system and method provide incentives for buyers to collect property information within the virtual property notebook.

The system and method can be used to automatically detect property structures and the user can be prompted to take further actions such as performing inspections of the property structures or otherwise gathering or entering additional information. By prompting users to enter additional information about identified structures the system can acquire labeled training data at a low cost and thereby improve the efficiency of the machine learning methods used for detecting structures and/or assessing the value of structures or the property itself.

As used herein, the terms "artificial intelligence" and "machine learning" may be used to describe a variety of techniques in which an algorithm can learn to improve its performance on a task (for example, classifying images into different categories). The embodiments can make use of any known methods and systems in artificial intelligence and/or machine learning.

As used herein, the term "augmented reality" refers to the ability to combine computer generated sensory information (for example, images) with a real-world environment (for example, images or video of a room or other space). The embodiments may make use of methods and systems related to the field of augmented reality. These include methods for identifying and mapping features in a real-world environment, for generating images and/or other sensory data, and for augmenting the real-world environment with the generated images/sensory data. For example, augmented reality systems (AR systems) may include the capability to: sense a physical space using one or more cameras and build models of the space; generate virtual elements; and augment images of the physical space with the virtual elements using a display of some kind.

FIG. 1 is a schematic view of a property information system 100. Property information system 100 is comprised of a property information storage system 102 and a plurality of data creators and users 104.

Property information system 100 may provide an alternative to conventional real estate listing services, such as the Multiple Listing Service (MLS). In conventional services, new data (in the form of property listings) are created and are only accessible to a subset of the parties involved in a real estate transaction (such as realtors). In contrast, property information system 100 may provide data that can be created and accessed by any or all parties commonly involved in a real estate transaction and/or parties that build or manage properties. Data creators and users 104 may include buyers 110, sellers 112, real estate agents 114, property assessors 116, property inspectors 118, property managers 120 and/or builders 122 (i.e., a home builder). Data creators and users 104 can participate in creating, gathering and/or using property data that may be stored in property information storage system 102. In some cases, data creators and users 104 may be equipped with a remote device that facilitates both gathering new data and using existing data. Such an arrangement may allow for property information, including property listings, to be crowdsourced, rather than created and maintained by an exclusive group such as registered realtors.

Property information storage system 102 may comprise one or more forms of structured data. In some cases, property information storage system 102 may comprise one or more tables or spreadsheets. In some cases, property information storage system 102 could comprise one or more databases. In embodiments using a database, any database model could be used. These include, but are not limited to: hierarchical databases, network databases, graph databases, entity—relationship databases, object oriented databases, document based databases, as well as other kinds of databases. In some cases, a relational database could be used, including databases built with the Structured Query Language (SQL). In other cases, a non-relational database could be used, such as a NoSQL database. In still other cases, property information storage system 102 could comprise structured data stored as a blockchain.

Data creators and users 104 may communicate with property information storage system 102 over one or more networks 106. In some cases, network 106 may be the Internet.

Figure 2:
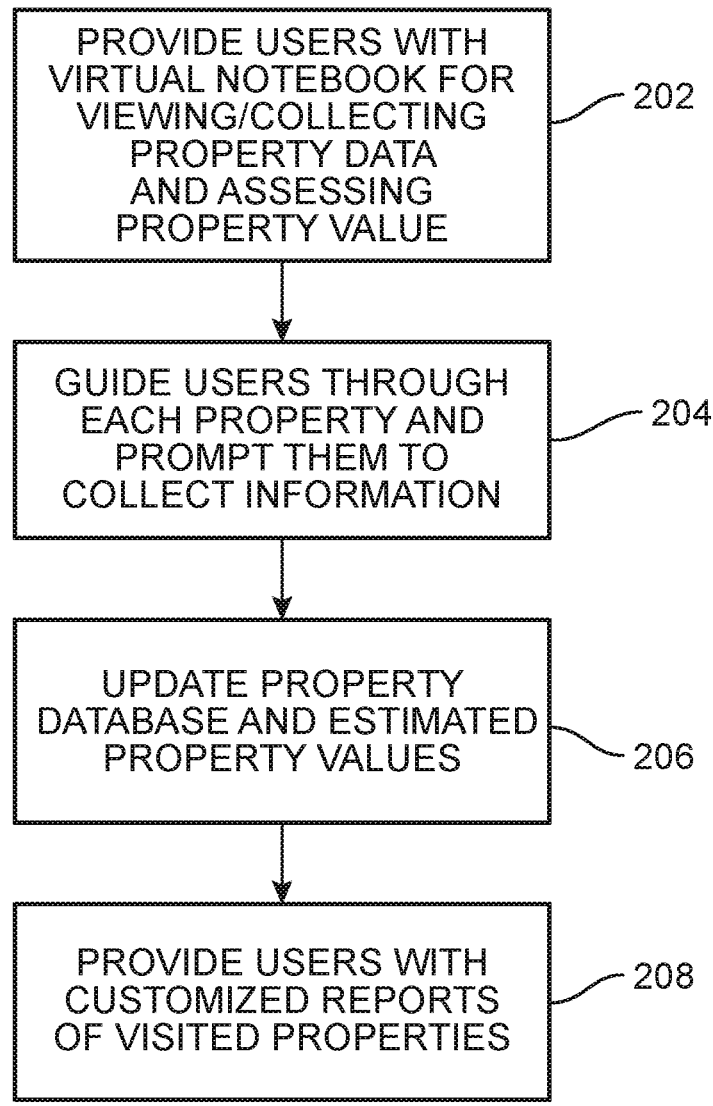
FIG. 2 is a schematic view of a process for collecting and using property information, according to an embodiment.
Figure 3:
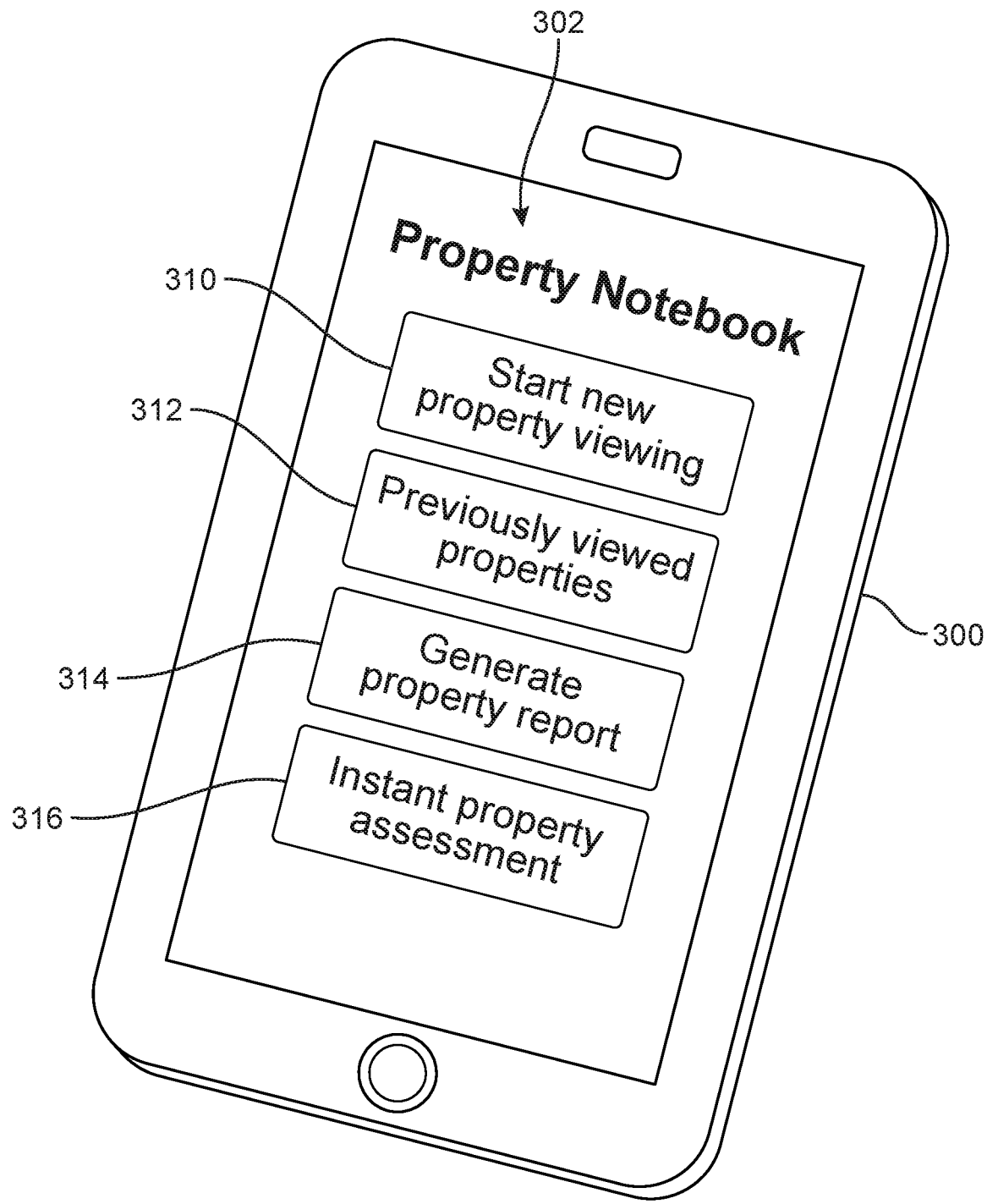
FIG. 3 is a schematic view of a remote device running a virtual property notebook, according to an embodiment.

FIG. 2 is a schematic view of a process for generating, updating and using property data associated with property information system 100. In a first step 202, users may be provided with a virtual notebook for viewing and/or collecting property data. The virtual property notebook could be provided on a remote device, such as a tablet computer. An exemplary tablet computing device 300 running a virtual property notebook software application is depicted in FIG. 3.

Next, in step 204, users may be guided through one or more properties. As the user is guided through each property the user may be prompted to collect property information. As used herein, the term "property information" refers to any kind of information that corresponds to a property. Property information can include, but is not limited to information that is commonly provided in property listings such as the MLS or in other real estate listings. Property information could include information related to the physical structure of a property as well as information about any appliances or other installed systems. Examples of property information can include, but are not limited to: address or other location information, architectural style (for example, ranch, split-level, etc.), size of home/apartment/building (i.e., square footage), size of land (i.e., acreage), number and sizes of rooms, room features (for example, hardwood floors, ceramic tile, or ceiling fans, granite countertops), electrical information, exterior features (for example, patio, porch, deck, pool), roof material (for example, fiberglass shingles), listing information (for example, listing date, time on the market, current listing price, previous listing prices), appliance information (for example, type of heating and cooling systems, type of water heater), regional information (for example, school district, city/town), as well as other kinds of property information.

Next, in step 206, a database (such as property information storage system 102) storing property information could be updated with any collected information. The new information could further be analyzed and used to provide predictive information such as estimated property values, estimated utility costs, estimated property taxes, estimated cost of ownership, estimated property insurance payments as well as other kinds of predictive information.

In a fourth step 208, users may receive customized reports of properties they visited. The report can help summarize and compare features across multiple properties the user visited. This reporting feature may be very helpful for would-be home buyers who often find it difficult to recall details about all the homes they've viewed in a short period of time. Optionally, of course, the report could also include one or more properties the user has not visited. In this way, the system can also be used to help users identify homes or other properties they would like to visit.

FIG. 3 is a schematic view of an embodiment of a virtual property notebook running on tablet computing device 300. The virtual property notebook is a software enabled tool that allows users to both collect and view property information for a given property. Specifically, the virtual property notebook provides access to a catalogue of property listings or entries. The property listings may be stored locally or in a remote database, such as property information storage system 102. The virtual property notebook may allow users to collect new property information, retrieve previously stored property information and to view property information in a variety of formats (including sorted lists, for example).

Referring to FIG. 3, virtual property notebook 302 may operate as a software application running on tablet computing device 300. For purposes of illustration, various possible functions of a virtual property notebook are depicted schematically as options under a menu. For example, a user may select first option 310 to start a new property viewing when they've arrived at a new property for a realtor showing, open house or inspection. In some cases, the virtual property notebook 302 may automatically detect the location (GPS coordinates and/or address) of the property using GPS and/or other location information (including information from mapping software applications that are installed on tablet computing device 300). In other cases, a user could manually enter the address, or other location information, of the new property. If there is already an existing entry in the property database the system could retrieve the available property information. Otherwise, the system may create a new entry or listing for the property database.

After generating a new entry and/or populating information for an existing entry, the system may then proceed to guide the user in collecting property information as discussed in further detail below and as shown in, for example, FIGS. 5-7.

From the menu a user may select second option 312 to get information about previously viewed properties. Upon selecting this option, virtual property notebook 302 may display a list of properties that have been previously viewed within a particular timeframe (a day, a week, a month or some other timeframe).

From the menu a user may select third option 314 to generate a property report. As used herein, the term "property report" refers to any collection of information about a property. Reports could include a raw listing of all data related to each property, a particular subset of information or an automated summary. A property report may help users to organize and compare properties. As an example, home buyers often go on a home viewing spree, seeing five, ten or even more homes for sale in one day. It may be difficult for the buyers to remember the details (the layout, the number of bedrooms, etc.) for each separate home. Therefore, a property report can help summarize information from each property in a way that allows a user to easily compare and contrast properties to decide which properties they may be interested in, or may want to view a second time. A property report can be static, or could be dynamic and include options for a user to rank or otherwise sort listings. In some cases, a user's preferences could be collected and the report could rank properties according to those user's preferences.

It is contemplated that in some cases a user may simply want a quick estimate of a property's price and may not need to make comparisons with other properties. Such functionality may be useful to a homeowner who wants to know what their house is worth before deciding whether or not to put it on the market. In this case a user could select option 316 to have an instant property assessment done. This instant property assessment could be performed on the basis of existing property information stored in a database, or could be performed after guiding the user through a quick inspection of the property.

Figure 4:
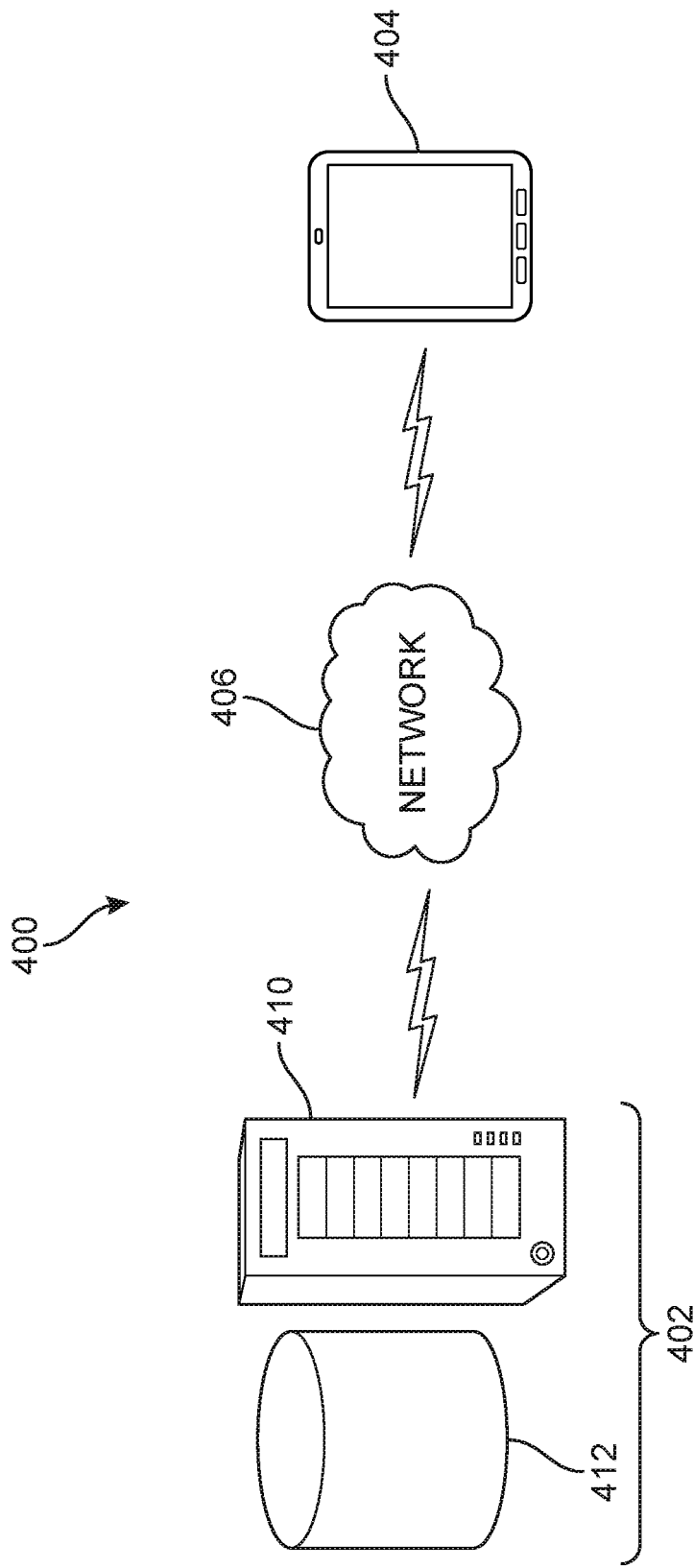
FIG. 4 is a schematic view of some components of a property information system, according to an embodiment.

FIG. 4 is a schematic view of an embodiment of some components of property information system 100 that facilitate the collection, analysis and storage of property information. System 100 may comprise a centralized computer system 402 and a remote device 404 that may communicate with one another through a network 406. The term "computer system" refers to the computing resources of a single computer, the partial computing resources of a single computer, a plurality of computers communicating with one another, or a network of remote servers. In an exemplary embodiment, computer system 402 includes at least one server.

Centralized computer system 402 may receive various kinds of information from remote device 404 (or other sources), perform various kinds of analyses and/or store data. Whereas centralized computer system 402 may be located anywhere, remote device 404 may be located on site (for example, at a house that is for sale) to facilitate the collection of data for the property information system.

In the embodiment of FIG. 4, centralized computer system 402 comprises one or more computing devices 410 (for example, a server) that may be in communication with one or more databases 412. Databases 412 could be co-located with computing device 410 or could be remote databases that are accessible by computing device 410 over network 406. Databases 412 can include any kind of storage devices, including but not limited magnetic, optical, magneto-optical, and/or memory, including volatile memory and non-volatile memory. Databases 412 may include property information storage system 102.

Remote device 404 may comprise a device that can be brought on-site to a property and used by one or more of the data creators and users 104 of FIG. 1. Remote device 404 can comprise a computer system for processing and communicating information. A remote device may generally include a processor, a data storage component and a display. A remote device may also include components to facilitate communication with external systems (for example, hardware and software components to enable communication over network 406). In some cases, a remote device includes one or more physical buttons. In some cases, a remote device includes touchscreen controls. Still further, remote device 404 can include speakers and a microphone for receiving and generating audible sounds. In the exemplary embodiment of FIG. 4, remote device 404 comprises a tablet computing device. In other embodiments, however, a remote device could comprise a smartphone, a laptop, or similar kind of device.

Remote device 404 may include hardware components for capturing sensory information, as well as storing and/or transmitting captured information. As used herein the term "sensory information" can include visual information, audible information, tactile information and/or information related to the motion of the remote device (for example, acceleration information). In an exemplary embodiment, remote device 404 includes a camera for capturing images in the form of photos or video. Remote device 404 may also include an accelerometer and/or gyroscope for detecting linear accelerations and/or angular rotational velocity. In some cases, accelerometer and/or gyroscope data can be used by an AR system to build a map of a physical space and locate the remote device within the map.

Remote device 404 may include additional sensors including, but not limited to: a proximity sensor to detect proximity to one or more objects in a physical space, an ambient light sensor for detecting ambient light conditions in a physical space, and a compass for detecting directional information. Additionally, in some embodiments, remote device 404 may include a GPS receiver for receiving GPS information that can be used to determine the location of the remote device.

Remote device 404 may run one or more software applications. As described previously, a remote device can run a virtual property notebook. In addition, remote device 404 could run one or more software applications that facilitate guiding a user through the property and collecting information. In some cases, a virtual property notebook application can incorporate provisions for guidance and information collection. Software applications could be native to the device's operating system or web-applications that run on a browser. Moreover, an application may be configured with a graphical user interface (GUI) that facilitates visual and/or tactile interaction between a user and elements of a property information system. In some embodiments, the application can incorporate AR functionality, with the ability to display augmented images, text or other indicia over photos or live camera feeds displayed on a screen of a remote device.

A remote device and a centralized computer system could operate in a client-server relationship. For example, centralized computer system 402 may include a server that communicates with remote device 404 as well as other remote devices. In some cases, multiple remote devices running individual instances of a virtual property notebook application could operate as clients in communication with centralized computer system 402 over network 406.

Figure 5:
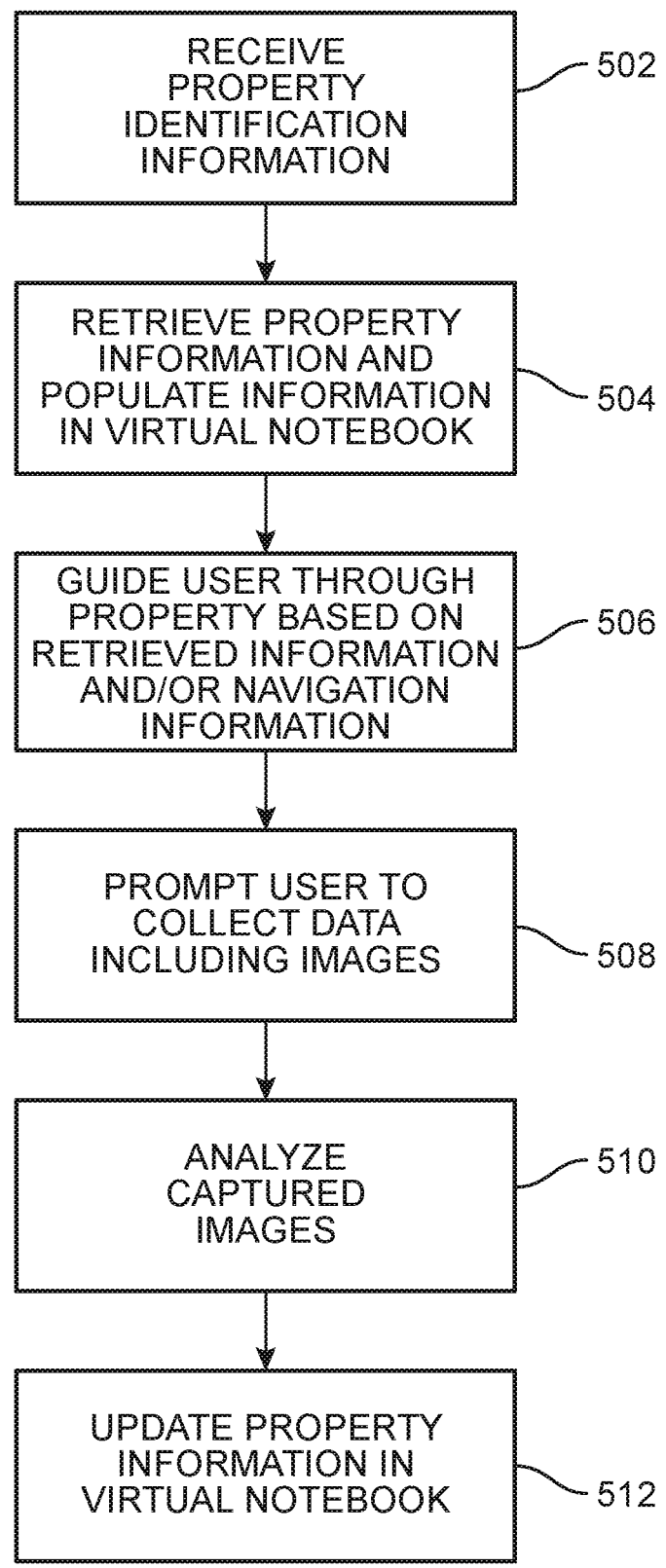
FIG. 5 is a schematic view of a process for gathering property information, according to an embodiment.

An exemplary process for using a remote device running an instance of a virtual property notebook to collect property information is depicted in FIG. 5. The process described in FIG. 5 may include steps conducted by a single resource or by multiple resources of a property information system. For example, in one embodiment each of the steps of FIG. 5 may be performed within one or more software applications running on a remote device. In another embodiment, some steps may be performed locally by a remote device while other steps may be performed on a centralized computer system (i.e., a server).

In a first step 502, a remote device could receive property identification information. The property identification information may be a street address (and, optionally, city and state). Alternatively, the property identification information could be an identification number, such as an MLS number or other unique identifier. This information could be obtained from manual input by the user, or by retrieving an address automatically using a navigation application running on the remote device. Next, in step 504, the remote device could retrieve any existing property information and populate the virtual property notebook with this information. In some cases, this step includes sending a request to a server that manages access to property information storage system 102. Once the virtual property notebook is populated with information, the remote device could display some of the information for the user, or provide options for displaying the information.

Next, in step 506, the remote device may guide the user through the property based on retrieved information and/or other available navigation information. As used herein, the term "navigation information" refers to any information that can be used in determining a location and/or providing directions or instructions from one location to another. In the context of navigating properties such as apartments, houses and other buildings, navigation information can include relative and absolute location information. Absolute location information can include rooms, GPS coordinates or other geographical information. Absolute location information may also be identified with the locations of known fixed structures such as doors, walls, windows, countertops and support beams. An example of relative location information includes giving a linear distance from a known fixed structure (such as a set distance from a particular window).

A remote device can direct a user through a property via one or more guidance prompts. The term "guidance prompt" could refer to displayed text, audible speech, other visual indicators and/or some combination of these. In one embodiment, a system could display a map of the physical space and display a path (or arrow) from the user's current location to another location where the system wants to user to move. In another embodiment, a system could provide verbal commands, such as "move forward 3 feet", "move closer to the wall in front of you", or "move to the kitchen". Such verbal commands could be spoken or displayed as text on the remote device.

To guide a user through a physical space and provide instructions to move relative to a structure, or to move between different structures, a guided inspection system may incorporate a model of the physical space. In some embodiments, the model may be implemented by an augmented reality system that identifies new structures (for example, walls and doors) and builds a real-time model of both the physical space and the remote device/camera within the physical space. Using this model, the system can provide navigation instructions to a user. Specifically, the system can provide navigation instructions directing the user to move closer to a structure, or more generally to move between two different locations within the physical space.

To build a real-time model of the physical space and locate and track the changing position and/or orientation of the remote device in the physical space, a system may make use of multiple modes of sensory data from the remote device. For example, some embodiments may use a combination of image information from the camera of a remote device, acceleration information from an accelerometer of the remote device and angular velocity information from a gyroscope of the remote device to map out the physical space in real time and orient/track the remote device through the physical space.

Apart from using augmented reality techniques, a system could make direct use of GPS information and/or map information provided ahead of time. In some cases, maps of the interior of a property may be available from a third party and/or from the owner/manager of the property. A system could retrieve a map of the physical space and use GPS information received through a GPS receiver to track movement and position of the remote device/user.

Once the remote device has helped a used navigate to a predetermined location, the remote device may prompt the user to collect data in step 508. Collecting data can include capturing images or other sensory information about local environment. In some cases, collecting data may also include receiving manual user input, such as selections from a drop-down menu, tags for images, notes or other information.

In step 510, the captured data, including any image data, could be analyzed. In some cases, one or more analyses could be performed at the remote device. In other cases, the remote device could send image data and other kinds of data to a server for further processing. In either case, in step 512 the results of the analysis could be used to update property information in the virtual property notebook and/or in the property information storage system 102.

As the user is guided through a property the system may automatically identify one or more property structures. As used herein, the term "property structure" refers to any structure that forms part of the physical structure of a property (that is, of a building such as a house, apartment building or other kind of building), and/or a structure which is otherwise attached or integrated into the physical structure of the property. Examples of property structures include, but are not limited to: walls, doors, door frames, windows, blinds, curtains, ceilings, floors, carpets, counters, cabinets, tables, light fixtures, electrical sockets, appliances, vents, toilets, bathtubs, sinks, as well as other structures. Physical structures could include both fixed and moveable structures. As used herein, the term "fixed structure" refers to a structure with a fixed position within the physical space, which cannot be displaced without disassembly or destruction. Examples of fixed structures include walls, doors and cabinets. Examples of moveable structures include furniture and appliances.

Analysis of captured data can include object detection and recognition. However, it may not be possible to determine everything about a property structure from images alone, especially early in the development of the system when the number of training points (i.e., images) is relatively small. In this case, it may be useful to request that a user take further actions to inspect or otherwise collect additional information about a particular property structure.

Figure 6:
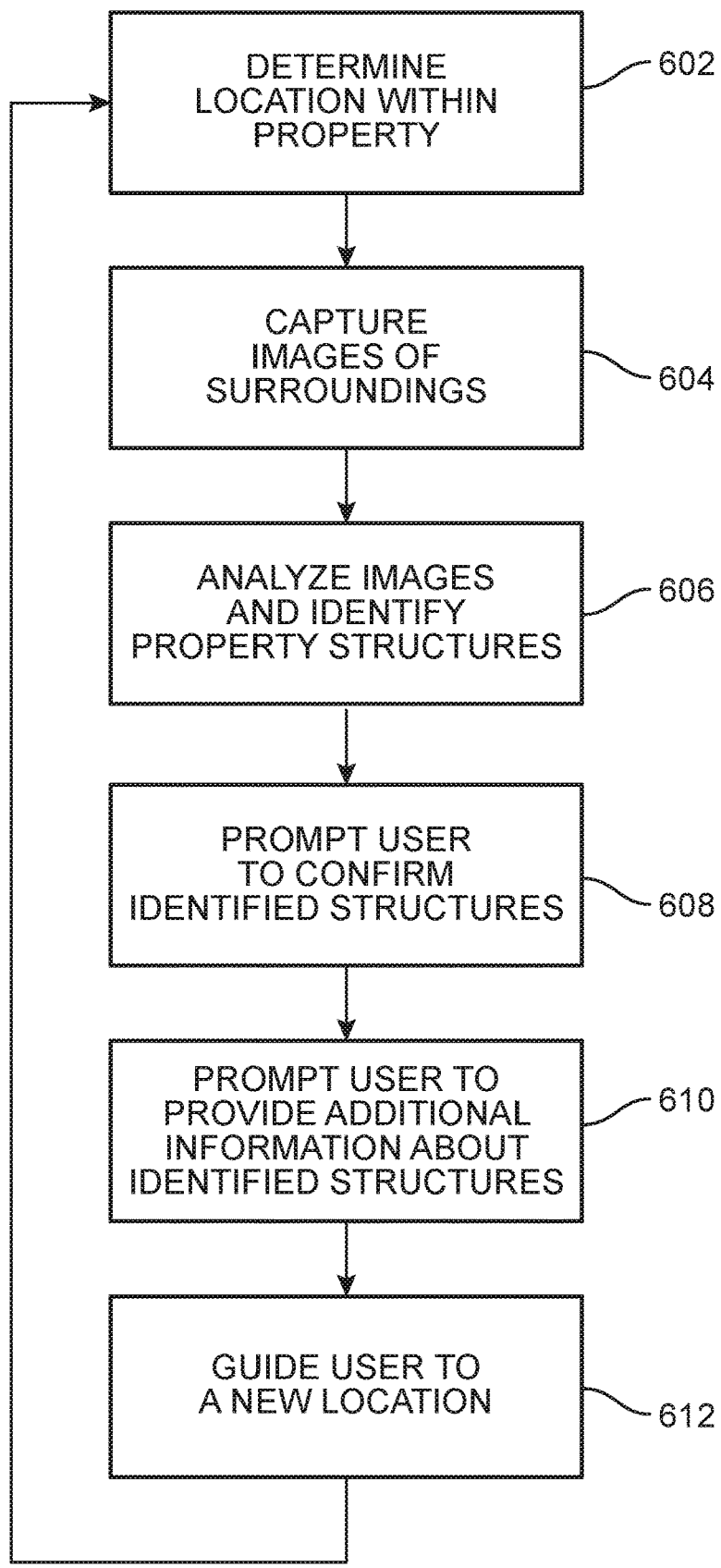
FIG. 6 is a schematic view of a process for guiding a user through a property and prompting the user to collect information, according to an embodiment.

Additional details of the exemplary process depicted in FIG. 5 are shown in FIG. 6. Specifically, the steps of FIG. 6 comprise an example of an iterative process where a user is guided to different locations throughout a property, data is collected and a user is prompted to provide additional details about one or more identified property features. The process described in FIG. 6 may include steps conducted by a single resource or by multiple resources of a property information system. For example, in one embodiment each of the steps of FIG. 6 may be performed within one or more software applications running on a remote device. In another embodiment, some steps may be performed locally by a remote device while other steps may be performed on a centralized computer system (i.e., a server).

In step 602, the remote device may determine the current location within a property. The remote device may determine the user's location using various methods and available systems. For example, the remote device could monitor accelerometer information from an accelerometer (and/or gyroscopic information from a gyroscope sensor) to track the movement of the user throughout the property from a known starting location. In some cases, the remote device could use image information to determine if/where a user has moved. In some cases, an augmented reality system may use image information from a camera along with acceleration and angular velocity information to track the user's location relative to a known starting position. As another example, the remote device could use GPS information to determine the user's location.

Next, in step 604, the remote device may capture images of the surroundings and/or other sensory data corresponding to the surroundings. A remote device system may instruct a user to capture images or other sensory information about the local environment. For example, the remote device could prompt a user to "focus the camera on the kitchen countertop and take a picture." Alternatively, the system could automatically take pictures (or video) of one or more physical structures as they are automatically identified by an image detection/recognition algorithm. In some cases, a user may be prompted to aim the camera at a particular physical structure, or in a particular direction, and the remote device may automatically capture images.

In step 606, the captured images or other data could be analyzed. In some cases, the remote device can perform analyses. In other cases, the remote device can send image information and/or other data to a server for further processing. During analysis (for example, image recognition or feature detection), one or more features of the property could be identified (for example, built-in structures or appliances). In some cases, during step 608, the remote device may prompt a user to confirm that a property structure has been identified correctly. For example, FIG. 7 depicts a situation where remote device 404 has captured an image of a kitchen 700 and, following further analysis, a countertop has been detected. In this case, the user is provided with prompt 702 to confirm if the system has correctly identified a countertop.

Next, in step 610, the remote device may optionally prompt a user to provide additional information about one or more identified features. As an example, in FIG. 7 the user is further provided with prompt 704 and asked to select a material for the countertop (granite, laminate or concrete). In other cases, a user could be prompted to apply custom tags or labels to images or identified features. Because obtaining good labeled training data for machine learning systems is often time consuming and expensive, the process depicted in FIGS. 6 and 7 may be especially helpful. Specifically, the method provides labeled training data that is generated from images and user given tags/labels.

Figure 7:
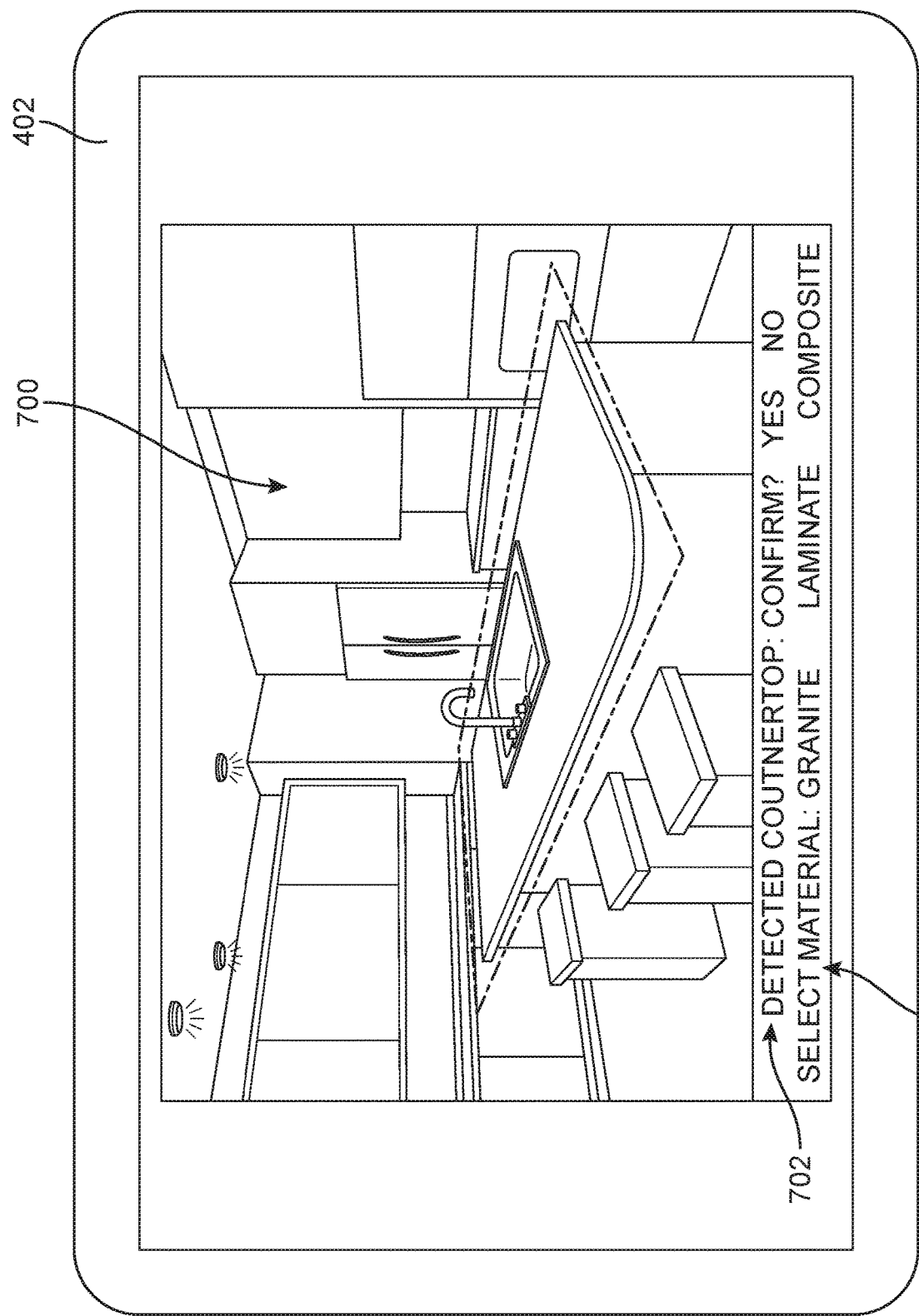
FIG. 7 is a schematic view of a step of prompting a user to collect property information with a remote device, according to an embodiment.

While the embodiment of FIG. 7 depicts text-based prompts to provide instructions to a user, audible prompts, in the form of computer generated speech and/or other kinds of prompts could also be used. In some cases, multiple types of prompts can be used simultaneously, including a combination of text/indicia and spoken instructions.

It may be appreciated that the method described in FIG. 6 can be applied to a variety of physical structures. For example, a system could identify molding and prompt a user to input the type of molding (for example, crown molding or cove molding). Likewise, a system could identify flooring and prompt a user to input the type of material used in the floors. With time, as a system is trained on additional data, the system may learn to identify not only the type of physical structure (for example, a door or a water heater), but the system can also learn to identify materials or other features.

In step 612, the remote device may guide the user to a new location to collect further data. This process can be repeated to gather further property information about at various locations within the property. It is contemplated that the system could guide a user through a property in a predetermined manner or in an ad hoc manner. In a predetermined inspection, the system is aware of a set of known property structures to be inspected. For example, a system could be provided with a map of the physical space, noting the existence and relative locations of various property structures such as walls, ceilings, floors, doors, rooms, bathrooms, hot water heaters, furnaces, as well as other structures. In this case, the system could guide a user from feature to feature in a predetermined sequence. Alternatively, in an ad hoc inspection, a system may not be aware of one or more property structures ahead of time. In this case, the system could direct a user to move from one structure to another in a more ad hoc manner. In some cases, the system could simply ask a user to proceed to another structure without knowing about the structure. For example, the user could be prompted to "move to the next room", or to "move to the door of the hallway bathroom", or to "find the hot water heater". In some embodiments, a system could learn new information about a physical space in real time and use that information to direct the user to another structure that it has recently identified.

Figure 8:
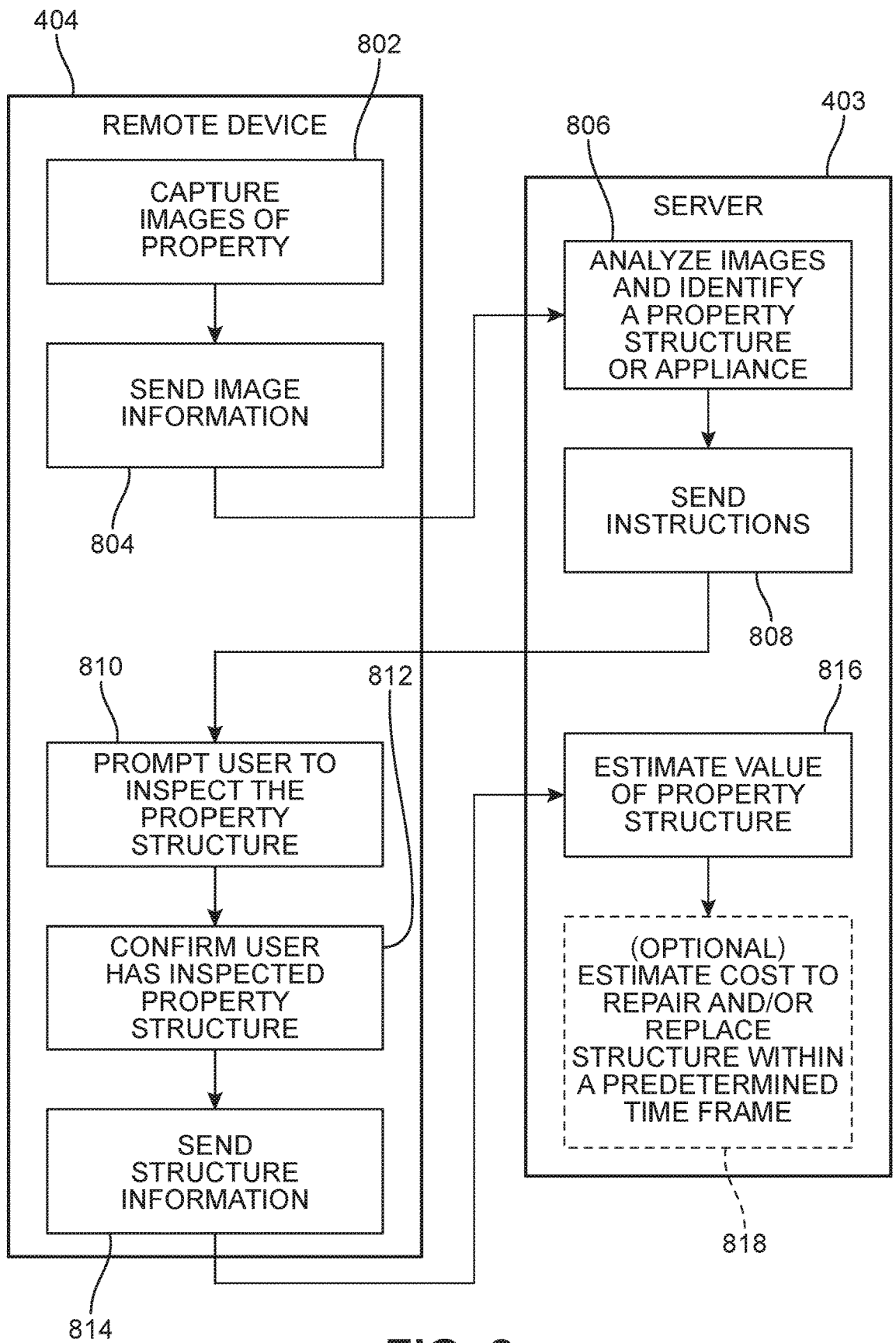
FIG. 8 is a schematic view of a process of guiding a user to inspect a property structure, according to an embodiment.

FIG. 8 is an exemplary embodiment of a process where a property information system is used to detect a property structure. The exemplary process depicted in FIG. 8 shows that some steps could be performed by a remote device (for example, remote device 404) and other steps by a component of a centralized computer system (for example, a server 403 of centralized computer system 402). In other embodiments, some steps shown as performed by a remote device could be performed by a centralized computer system or vice-versa.

In step 802, remove device 404 may capture images of the property, including its immediate surroundings. In some cases, this could occur after remote device 404 has guided a user to a predetermined location in the property, as in step 612 of FIG. 6. In some cases, remote device 404 may prompt a user to aim the camera and/or take images of one or more physical structures at the location. For example, if the user is in a laundry room remote device 404 may prompt the user to take images of the washer and dryer, if those appliances are present. In some other embodiments, remote device 404 may automatically take pictures or video without prompting a user. Optionally, remote device 404 could prompt a user to aim the camera at a certain area or feature in the room but may take images or videos automatically without further user action.

Image information from remote device 404 may be sent to server 403 during step 804 for further analysis. The term "image information", as used herein, refers to any information corresponding to photos or videos. Image information could be stored in any known image file formats, such as JPEG, TIFF, GIF, PNG and BMP. Image information could also be stored in any known video file formats, such as AVI, FLV, WMV, MOV and MP4.

Figure 9:
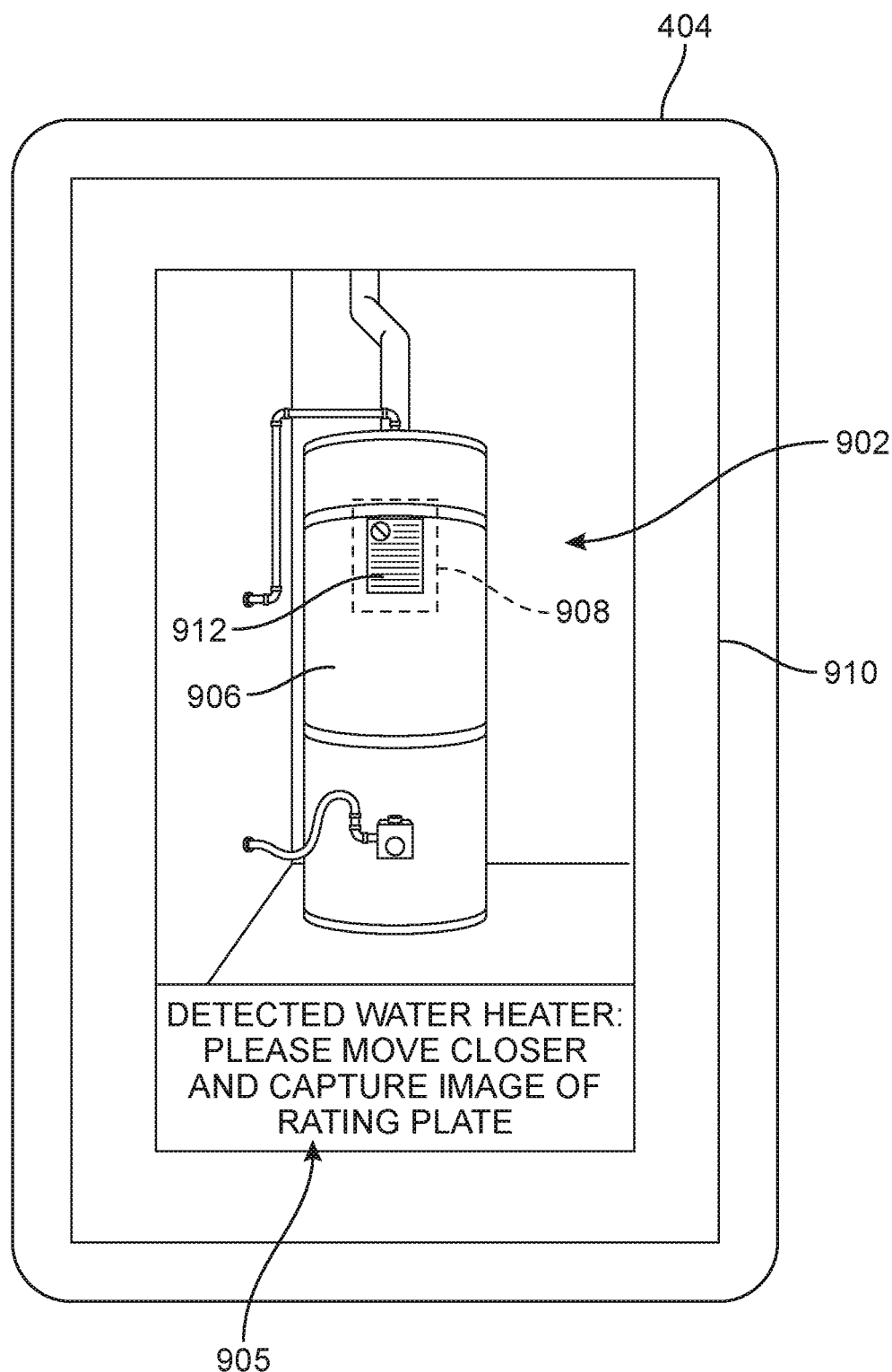
FIG. 9 is a schematic view of a step of prompting a user to inspect an appliance, according to an embodiment.

In step 806, server 403 may analyze the image information and identify any appliances or other kinds of property structures. Specifically, the image information may be processed by one or more machine learning and/or machine vision algorithms to detect and classify the state of one or more physical structures. As an example, FIG. 9 depicts a situation where remote device 404 captures images in a closet 902 of a home. This image is fed into a machine learning module configured to detect and classify property structures. After analyzing the image (in step 804), the system identifies water heater 906.

After analyzing image information and identifying any physical structures, server 403 may send back instructions to remote device 404 in step 808. The instructions may be based on information from step 806. Specifically, if server 403 detects any property structures during step 806, server 403 may send instructions including a request that a user gather more information about the appliance.

Based on the instructions that remote device 404 receives from server 403, remote device 404 may prompt the user to inspect the property structure at step 810. An example of such a prompt is depicted in FIG. 9. After identifying water heater 906, a prompt 905 is displayed to the user. Prompt 905 states that a water heater has been detected and provides further instructions for the user to move closer to the water heater and capture an image of the water heater's Rating Plate. The Rating Plate on water heaters lists important data such as the model and serial numbers, manufacturing company's name, length of warranty, wattage of elements installed (on electric models), gallon capacity, and input BTU rating (gas models). By processing images of the Rating Plate (for example, using optical character recognition) the system can obtain important data about the age of the water heater and/or other information that may be useful in estimating its value. In some embodiments, remote device 404 can provide a visual indicator 908 on screen 910 to help a user in locating the rating plate 912. The visual indicator may be displayed over a live image or video feed of the water heater using augmented reality.

In a step 812, remote device 404 may confirm that the user has inspected the identified appliance. In cases where the system is waiting for confirmation it could prompt the user a second time to identify the appliance and/or provide further instructions for proceeding with the inspection.

Structure information about one or more property structures can be passed from remote to device 404 to server 403 during step 814. This information can then be used to predicting various outputs. By identifying appliances in a property and details of the current state of the appliances, a property information system can make more accurate estimates of a property's value and/or the cost of ownership of the property. In step 816, server 403 could use the structure information along with possibly other information to estimate a value of the property structure. The estimated value of the property structure could later be used to determine an overall estimated property value for the property. Optionally, in step 818, server 403 could use the captured structure information to estimate the cost of repairing and/or replacing the property structure within a predetermined time frame.

Although FIG. 9 depicts an appliance, it may be appreciated that the process described in FIG. 8 can apply to any kind of property structure, including fixed or built-in structures like walls, roofs, floors or other structures that a system can collect information about in order to provide an estimated property value.

The embodiment of FIG. 8 is characterized by a process where some steps are performed by a server of a centralized computer system. Optionally, in some other embodiments, some of step 806, step 816 and/or step 818, could performed by remote device 404.

Figure 10:
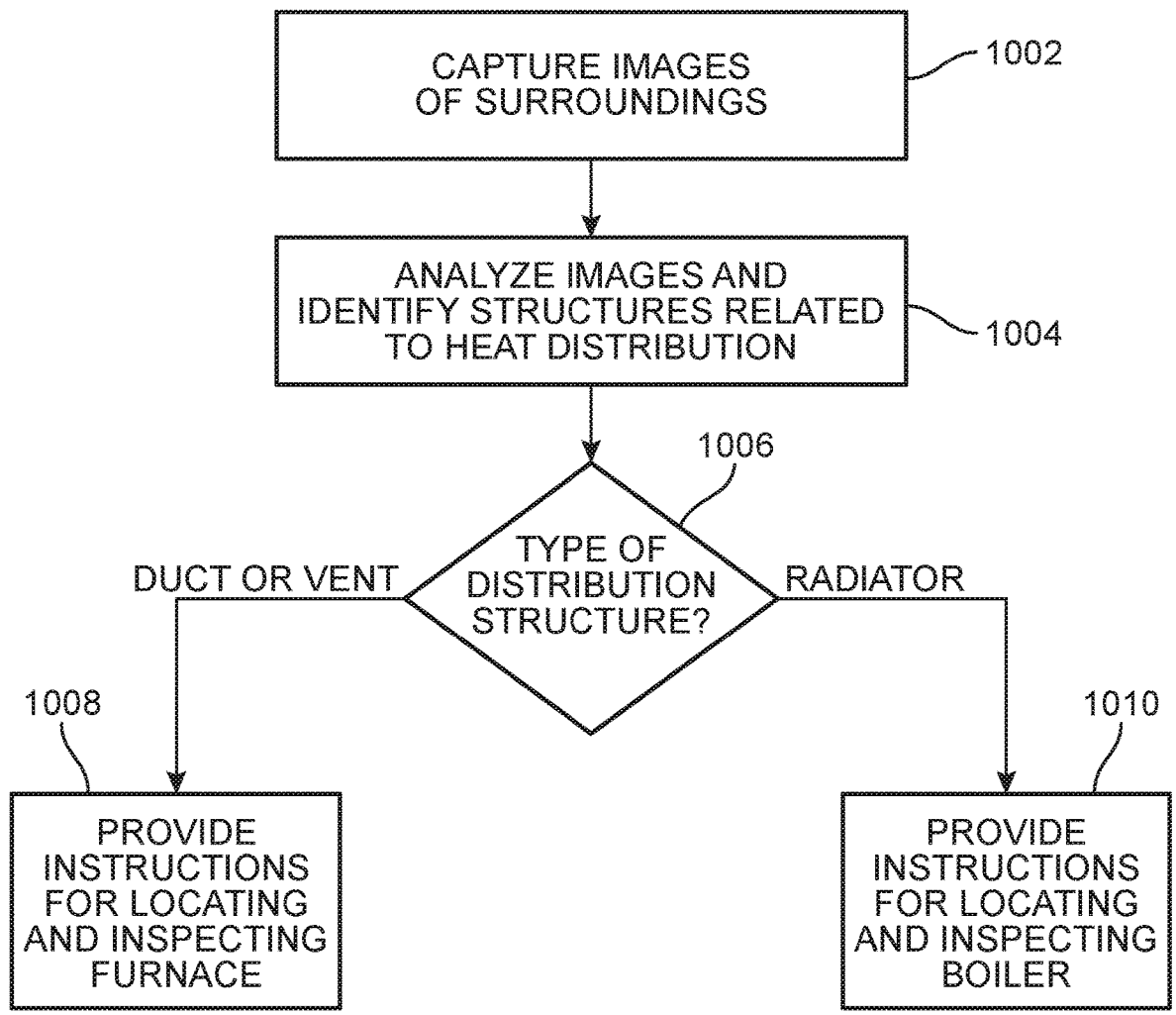
FIG. 10 is a schematic view of a process of guiding a user to inspect a heat source based on information gathered about a heat distribution system, according to an embodiment.

It is contemplated that in some embodiments a property information system could anticipate property structures and/or appliances that should be inspected based on previously captured information. Referring to FIG. 10, in one embodiment a property information system can anticipate various property structures that should be inspected once the system has learned information related to the type of heating system used to heat the property. Starting at step 1002, the system may capture images of the surroundings. In step 1004, the system may analyze and identify one or more physical structures related to heat distribution. Examples of heat distribution components for properties include ducts and vents, radiators, radiant heating panels, hot water baseboards and electric baseboards. In step 1006, the system uses information from step 1004 to determine further instructions that would allow a user to locate and inspect a particular type of heating source. Examples of heating sources for a property include furnaces, boilers, heat pumps, active solar heaters and electric resistance heaters.

If, at step 1006, the type of distribution structure is identified as a heating duct or vent, the system proceeds to step 1008. At step 1008 the system provides instructions for locating and inspecting a furnace. If, at step 1008, the type of distribution system is identified as a radiator, the system proceeds to step 1010. At step 1010, the system provides instructions for locating and inspecting a boiler. It may be appreciated at these are only two possible examples of inferences the system can make in guiding a user to inspect a particular heat source based on an identified type of heat distribution system or component. In other embodiments, the system could identify radiant heating panels, hot water baseboards and/or electric baseboards as well. Moreover, because some distribution systems can be used with two or more kinds of heat sources, in other embodiments a system may include additional provisions to select the more likely type of heat source according to the distribution system and any other relevant information.

A system could guide a user to a heat source using various different methods. In situations where the system has an architectural diagram or other information from which it can directly infer the location of the heat source (for example, a furnace), the system can provide explicit navigational instructions for walking from the user's current location to the location of the heat source. However, when the location of the heat source is not immediately available the system can help guide a user to possible or likely locations based on common locations for a particular kind of heat source. For example, if the system identifies the heating source as most likely being a furnace, the system can prompt a user to look in a utility room or closet or basement. If the system identifies the heating source as most likely being a heat pump, the system can prompt a user to look outside the property, for example along a rearward wall of the property.

It may be appreciated that the process described above and depicted in FIG. 10 is not limited to helping users locate and inspect heating systems. A similar process could also be used for air conditioning systems, central vacuum systems, pools or other structures or systems that include two or more distributed components. This process can be used with any system where identifying one part of the system allows a property information system to infer the presence of another part, and thereby guide a user to locate and inspect the part. Thus, it may be seen that the property information system helps anticipate various property structures that should be inspected without knowing a priori any information about (or even the existence of) those property structures. Furthermore, in some cases the system could retrieve information from an external resource and prompt a user to inspect a property structure in response to the externally retrieved information. For example, a system could retrieve data about water in a particular geographic location from publicly available databases. If retrieved data indicated that the local water supply has a high mineral content, the system could prompt a user to check the property for a water softener.

Figure 11:
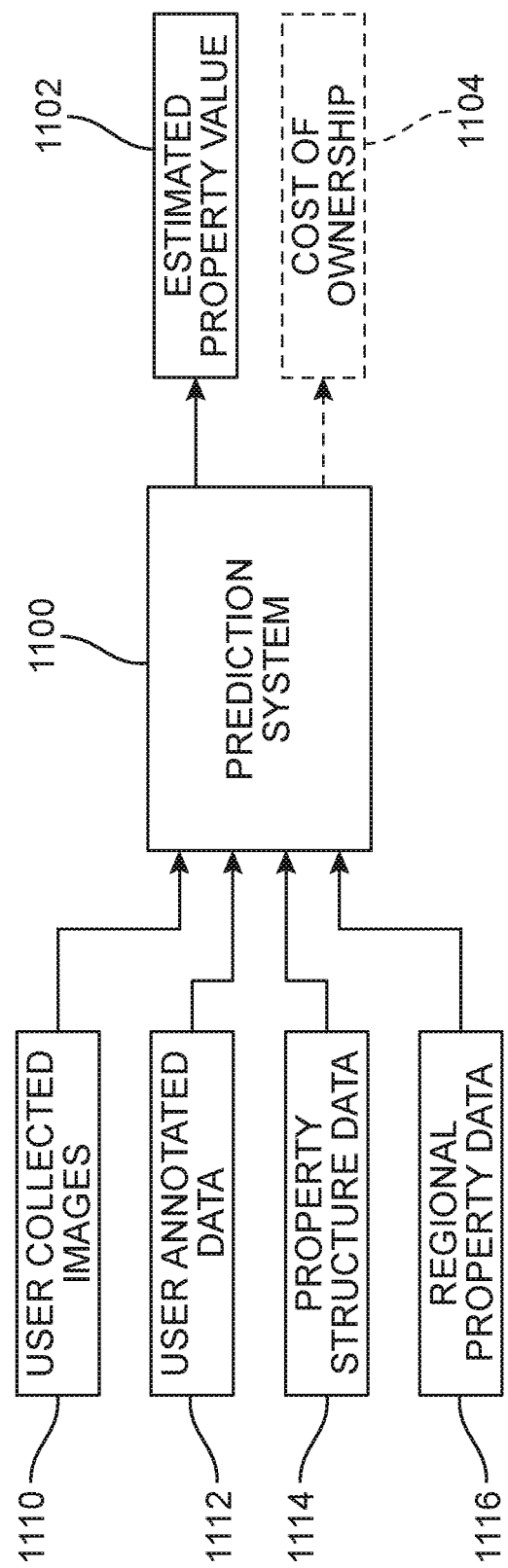
FIG. 11 is a schematic view of a prediction system for determining an estimate property value, according to an embodiment.

Referring to FIG. 11, a property information system may include a prediction system 1100 that can output an estimated property value 1102 for a property. In some cases, prediction system 1100 can also be configured to output a cost of ownership value 1104. The cost of ownership value may be different from the estimated value of a property as the cost of ownership may also account for likely repair/replacement costs to appliances or other structures in some predetermined timeframe (for example, 5 years, 10 years or 30 years). Optionally, prediction system 1100 could also be configured to output an insurance quote (such as a home insurance quote), projected yearly taxes and estimate mortgage costs (which is a function not only of the estimated property value, but also of the user's credit history, available cash for a down payment, and interest rates, as well as possibly other factors).

The estimated property value 1102 can be determined according to various inputs. These inputs may include user collected images 1110 (for example, images of rooms, built-in structures and appliances). These inputs may also include user annotated data 1112 (for example, user created labels for images, identified structures and structure materials). These inputs may also include property structure data 1114. Property structure data may include data about structures that have been automatically identified and classified by a property information system using images or other sensory information available from a remote device. One example is the water heater identified in the exemplary situation shown in FIG. 9. Property structure data could also include information related to architectural drawings or a list of materials provided by a builder of the property. The inputs to prediction system 1100 may also include regional property data 1116. Regional property data 1116 can include any data about comparable sales in the local property market, property tax information, school district information and/or other kinds of information that might influence the price of a property such as a home or commercial building.

The system and methods described herein may find a variety of uses in the real estate domain. For example, in one embodiment the system and method could be used to facilitate assessing a home's value, a function typically performed by an assessor. In some cases, the system and method could be used for remote assessments. Specifically, a user (for example, a potential seller) could capture property information using the systems and methods described above and then send the property information to an assessor who may determine an estimated listing price for the property. The systems and methods can also be used to help potential buyers get loans from banks.

The systems and methods described herein may help reduce costs associated with real estate transactions, for example by reducing assessment costs for sellers and/or buyers. Moreover, in contrast to systems that might rely on out of date property information, the current system and method facilitate gathering up to date property information.

To detect and classify property structures, and/or to predict estimated property values and/or cost of ownership, the embodiments may utilize a machine learning system. As used herein, the term "machine learning system" refers to any collection of one or more machine learning algorithms. Some machine learning systems may incorporate various different kinds of algorithms, as different tasks may require different types of machine learning algorithms. Generally, a machine learning system will take input data and output one or more kinds of predicted values. The input data could take any form including image data, text data, audio data or various other kinds of data. The output predicted values could be numbers taking on discrete or continuous values. The predicted values could also be discrete classes (for example, a "countertop" class and a "water heater" class). Numerical outputs could represent a probability that the input belongs to a various classes. Moreover, it may be appreciated that the same machine learning system can be used for training, testing and deployment, in some cases.

Techniques from artificial intelligence and machine learning could be used for image detection and/or recognition as well as for other purposes. For example, the embodiments could make use of any methods from the field of machine (or computer) vision including methods, techniques, or algorithms in machine vision and/or feature detection to identify and classify objects. Embodiments may use any known image processing methods such as stitching/registration, filtering, thresholding, pixel counting, segmentation, edge detection, color analysis, blob detection, pattern recognition or template matching, optical character recognition as well as other known methods. Some embodiments may use the scale-invariant feature transform (SIFT) algorithm that is used in object recognition, robotic mapping and image stitching. Embodiments may also use known techniques in deep learning to help process and classify objects within image data. These techniques include various kinds of deep neural networks. In some cases, embodiments may use one or more kinds of convolutional deep neural networks (CNNs) that are commonly used in image recognition and other areas of machine vision.

An AR system may make use of various known methods, techniques, or algorithms in robotics and/or navigation. For example, some embodiments may utilize the well known "simultaneous localization and mapping" (SLAM) technique for constructing and updating a map of an unknown environment and determining the location (and pose) of an agent within the map. Some implementations of SLAM can be used to help identify objects, determine distances between objects, determine the dimensions of objects, position objects in a virtual space and/or perform transformations of virtual objects (such as rotation). Various kinds of SLAM techniques are known and adapted to particular kinds of tasks. These include EKF SLAM, FastSLAM, Graph-based SLAM, Topological SLAM and Visual SLAM. Software tools for building AR systems are known and provided as open source or commercial AR software development kits (SDKs).

In some embodiments, various systems such as an AR system and/or a machine learning system could be implemented on a centralized computer system. In some embodiments, an AR system and/or a machine learning system could be provided through a cloud service. In still other embodiments, an AR system and/or a machine learning system could be integrated into software running on a remote device. Moreover, in some embodiments, some components or software modules of a system could run locally on a remote device while other components or modules run on a centralized computer system. For example, an AR system could have modules running on a remote device for storing model parameters and interfacing with sensors, and user interaction components (screen, controls, etc.). The AR system could also have modules running on a centralized computer system for more intensive processing tasks. Likewise, a machine learning system could be configured with some modules running directly on the remote device and other modules running on a centralized computer system for more intensive processing tasks.

It may be appreciated that given sufficient processing power and memory, some or all components of an AR system and/or a machine learning system could be implemented on a remote device (such as a tablet computer). In such embodiments, tasks described above as being completed by a centralized computer system or server could be handled by software modules implemented on the remote device. As one example, though many machine learning algorithms require intensive processing for training, once the parameters of a machine learning model (such as a neural network) have been learned the deployed machine learning algorithm or system may be less computationally intensive to run and could be configured to run efficiently on a mobile computing device such as a smart phone or tablet computer.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of guiding a user in assessing a property, comprising the steps of:
receiving image information from a camera of a remote device, the image information corresponding to at least one image of the property;
analyzing the image information using machine vision and detecting a type of distribution structure within the property related to heat distribution;
generating a physical model of the property using the image information;
generating a guidance prompt instructing a user of the remote device how to move through the property based on the physical model of the property to locate and inspect a heat source, based on the type of distribution structure;
gathering user movement information tracked using the image information, acceleration information from an accelerometer of the remote device, and angular velocity information from a gyroscope of the remote device;
receiving, as the user of the remote device moves through the property, captured images of property structures;
determining identities of the property structures based on the captured images of the property structures;
sending instructions to the remote device, the instructions providing updates to the guidance prompt to the user using an augmented reality system to move through the property to locate the heat source based on the type of distribution structure, the user movement information, and the identities of the property structures;
receiving inspection information from the remote device, the inspection information confirming a successful arrival at a location of the heat source by the user of the remote device;
sending instructions to the remote device to capture, using the camera, an image of a Rating Plate of the heat source;
receiving the image of the Rating Plate of the heat source; and
processing the image of the Rating Plate using optical character recognition to obtain data about the heat source.

2. The method according to claim 1, further comprising using the acceleration information to track a location of the user relative to a known starting position.

3. The method according to claim 1, wherein the identities of the property structures comprise at least one of a duct, a vent, a radiator, a radiant heating panel, a hot water baseboard, and an electric baseboard.

4. The method according to claim 3, wherein when the identities of the property structures comprise at least one of a duct and a vent, the heat source is determined to be a furnace, and when the identities of the property structures comprise a radiator, the heat source is determined to be a boiler.

5. The method according to claim 1, further comprising using the angular velocity information to track a location of the user relative to a known starting position.

6. The method according to claim 1, wherein the updates are further based on common locations for a particular kind of the heat source.

7. A method of guiding a user in assessing a property using a remote device, comprising the steps of:
capturing image information of the property using a camera of the remote device;
sending the image information to a server, the image information including at least one captured image of the property;
receiving an analysis of the image information performed using machine vision, the analysis detecting a type of distribution structure within the property related to heat distribution;
receiving a physical model of the property generated using the image information;
receiving a guidance prompt generated instructing a user of the remote device how to move through the property based on the physical model of the property to locate and inspect a heat source, based on the type of distribution structure;
receiving user movement information tracked using the image information, acceleration information from an accelerometer of the remote device, and angular velocity information from a gyroscope of the remote device;
capturing, as the user of the remote device moves through the property, images of property structures;
receiving identities of the property structures determined based on the images of the property structures;
receiving instructions from the server using an augmented reality system, the instructions providing updates to the guidance prompt generated to instruct the user of the remote device how to move through the property based on the physical model of the property to locate the heat source based on the type of distribution structure, the user movement information, and the identities of the property structures;
capturing inspection information corresponding to the heat source, the inspection information confirming a successful arrival at a location of the heat source by the user of the remote device;
sending the inspection information to the server;
receiving instructions to capture an image of a Rating Plate of the heat source;
capturing an image, using the camera, of the Rating Plate of the heat source; and
sending the image of the Rating Plate of the heat source to the server for processing using optical character recognition to obtain data about the heat source.

8. The method according to claim 7, further comprising tracking a location of the user relative to a known starting position using the acceleration information.

9. The method according to claim 7, further comprising tracking a location of the user relative to a known starting position using the angular velocity information.

10. The method according to claim 7, wherein the data about the heat source comprises an age of the heat source.

11. The method according to claim 7, wherein the updates are further based on common locations for a particular kind of the heat source.

12. The method according to claim 7, wherein the identities of the property structures comprise at least one of a duct, a vent, a radiator, a radiant heating panel, a hot water baseboard, and an electric baseboard.

13. The method according to claim 12, wherein when the identities of the property structures comprise at least one of a duct and a vent, the heat source is determined to be a furnace, and when the identities of the property structures comprise a radiator, the heat source is determined to be a boiler.

14. A method of creating a property entry in a catalogue of properties, comprising:
- receiving property information for a property, the property information including image information of the physical property;
- analyzing the image information using machine vision and detecting a type of distribution structure within the property related to heat distribution;
- generating a physical model of the property using the image information;
- generating a guidance prompt instructing a user of the remote device how to move through the property based on the physical model of the property to locate and inspect a heat source, based on the type of distribution structure;
- gathering user movement information tracked using the image information, acceleration information from an accelerometer of the remote device, and angular velocity information from a gyroscope of the remote device;
- receiving, as the user of the remote device moves through the property, captured images of property structures;
- determining identities of the property structures based on the captured images of the property structures;
- guiding a user from a first location in the property to a location of the heat source in the property, using updates to the guidance prompt provided using an augmented reality system and based on the type of distribution structure, the user movement information, and the identities of the property structures;
- capturing an image of a Rating Plate of the heat source at the location of the heat source at the second location;
- processing the image of the Rating Plate using optical character recognition to obtain data about the heat source; and
- generating information for the property entry based on the data about the heat source.

15. The method according to claim 14, wherein the identities of the property structures comprise at least one of a duct, a vent, a radiator, a radiant heating panel, a hot water baseboard, and an electric baseboard.

16. The method according to claim 15, wherein when the identities of the property structures comprise at least one of a duct and a vent, the heat source is determined to be a furnace, and when the identities of the property structures comprise a radiator, the heat source is determined to be a boiler.

17. The method according to claim 14, wherein the method includes creating a report with multiple property entries from the catalogue of properties.

18. The method according to claim 14, further comprising using the acceleration information to track a location of the user relative to a known starting position.

19. The method according to claim 14, further comprising using the angular velocity information to track a location of the user relative to a known starting position.

20. The method according to claim 14, wherein the updates are further based on common locations for a particular kind of the heat source.

\* \* \* \* \*